US008924380B1

(12) United States Patent
Koningstein

(10) Patent No.: US 8,924,380 B1
(45) Date of Patent: *Dec. 30, 2014

(54) CHANGING A RANK OF A DOCUMENT BY APPLYING A RANK TRANSITION FUNCTION

(75) Inventor: Ross Koningstein, Menlo Park, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/584,053

(22) Filed: Aug. 13, 2012

Related U.S. Application Data

(63) Continuation of application No. 12/652,563, filed on Jan. 5, 2010, now Pat. No. 8,244,722, which is a continuation of application No. 11/170,786, filed on Jun. 30, 2005, now abandoned.

(51) Int. Cl.
*G06F 17/30* (2006.01)
(52) U.S. Cl.
CPC ...... *G06F 17/3053* (2013.01); *G06F 17/30864* (2013.01)
USPC .......................................................... 707/725
(58) Field of Classification Search
CPC ........................ G06F 17/30864; G06F 17/3053
See application file for complete search history.

(56) References Cited

U.S. PATENT DOCUMENTS

| 6,546,388 | B1 | 4/2003 | Edlund et al. |
|---|---|---|---|
| 7,231,405 | B2 | 6/2007 | Xia |
| 7,370,381 | B2 | 5/2008 | Tuttle et al. |
| 7,562,068 | B2 | 7/2009 | Naam |
| 7,627,564 | B2 | 12/2009 | Yao et al. |
| 7,783,632 | B2 | 8/2010 | Richardson et al. |
| 7,831,582 | B1 | 11/2010 | Scofield et al. |
| 7,912,836 | B2 | 3/2011 | Tuttle et al. |
| 7,966,342 | B2 | 6/2011 | Gross |
| 8,051,071 | B2 | 11/2011 | Dean et al. |
| 8,082,246 | B2 | 12/2011 | Meyerzon et al. |
| 2003/0046389 | A1 | 3/2003 | Thieme |
| 2003/0078914 | A1* | 4/2003 | Witbrock .......................... 707/3 |
| 2003/0135490 | A1 | 7/2003 | Barrett et al. |
| 2003/0167443 | A1* | 9/2003 | Meunier et al. ............... 715/511 |
| 2004/0215606 | A1 | 10/2004 | Cossock |
| 2005/0060297 | A1 | 3/2005 | Najork |
| 2006/0004704 | A1 | 1/2006 | Gross |
| 2006/0004711 | A1 | 1/2006 | Naam |
| 2006/0004748 | A1* | 1/2006 | Ramarathnam et al. .......... 707/6 |
| 2006/0004811 | A1* | 1/2006 | McSherry ..................... 707/101 |

(Continued)

OTHER PUBLICATIONS

Bar-Ilan, Judit, Mark Levene, and Mazlita Mat-Hassan. "Dynamics of search engine rankings—A case study." In Proceedings of the 3rd International Workshop on Web Dynamics. 2004.*

(Continued)

*Primary Examiner* — Jason Liao
*Assistant Examiner* — Jesse P Frumkin
(74) *Attorney, Agent, or Firm* — Harrity & Harrity, LLP

(57) ABSTRACT

A system determines a first rank associated with a document and determines a second rank associated with the document, where the second rank is different from the first rank. The system also changes, during a transition period that occurs during a transition from the first rank to the second rank, a transition rank associated with the document based on a rank transition function that varies the transition rank over time without any change in ranking factors associated with the document.

20 Claims, 10 Drawing Sheets

(56) References Cited

U.S. PATENT DOCUMENTS

| | | | | |
|---|---|---|---|---|
| 2006/0294124 | A1* | 12/2006 | Cho | 707/101 |
| 2007/0094255 | A1* | 4/2007 | Acharya et al. | 707/5 |
| 2007/0150467 | A1* | 6/2007 | Beyer et al. | 707/5 |
| 2007/0173318 | A1 | 7/2007 | Abbott | |
| 2008/0140626 | A1* | 6/2008 | Wilson | 707/3 |
| 2008/0147669 | A1* | 6/2008 | Liu et al. | 707/10 |
| 2008/0256051 | A1* | 10/2008 | Liu et al. | 707/5 |
| 2008/0306942 | A1* | 12/2008 | Ravikumar et al. | 707/5 |
| 2009/0276389 | A1* | 11/2009 | Constantine et al. | 706/52 |
| 2011/0022605 | A1* | 1/2011 | Acharya et al. | 707/748 |
| 2011/0029542 | A1* | 2/2011 | Cutts et al. | 707/748 |
| 2011/0258185 | A1* | 10/2011 | Acharya et al. | 707/725 |
| 2011/0270890 | A1* | 11/2011 | Kamvar et al. | 707/798 |
| 2012/0209838 | A1* | 8/2012 | Dean et al. | 707/725 |

OTHER PUBLICATIONS

Zhang, Hui, Ashish Goel, Ramesh Govindan, Kahn Mason, and Benjamin Van Roy. "Making eigenvector-based reputation systems robust to collusion." In Algorithms and Models for the Web-Graph, pp. 92-104. Springer Berlin Heidelberg, 2004.*

Boldi, Paolo, Massimo Santini, and Sebastiano Vigna. "PageRank as a function of the damping factor." In Proceedings of the 14th international conference on World Wide Web, pp. 557-566. ACM, 2005.*

Shen, Guoyang, Bin Gao, Tie-Yan Liu, Guang Feng, Shiji Song, and Hang Li. "Detecting link spam using temporal information." In Data Mining, 2006. ICDM'06. Sixth International Conference on, pp. 1049-1053. IEEE, 2006.*

Svore, Krysta M., Qiang Wu, Chris JC Burges, and Aaswath Raman. "Improving web spam classification using rank-time features." In Proceedings of the 3rd international workshop on Adversarial information retrieval on the web, pp. 9-16. ACM, 2007.*

Gravano, Merging Ranks from Heterogeneous Internet Sources, 1997, VLBD Conference, pp. 196-205.

Fetterly, Spam, Damn Spam, and Statistics, Jun. 18, 2004, pp. 1-6.

Li, Yanhong, Toward a Qualitative Search Engine, 1998, IEEE, pp. 24-29.

Co-pending U.S. Appl. No. 12/652,563, filed Jan. 5, 2010 entitled "Ranking Documents," Ross Koningstein, 38 pages.

NOVA; "Decoding Nazi Secrets," www.pbs.org; Nov. 9, 1999; pp. 1-18.

* cited by examiner

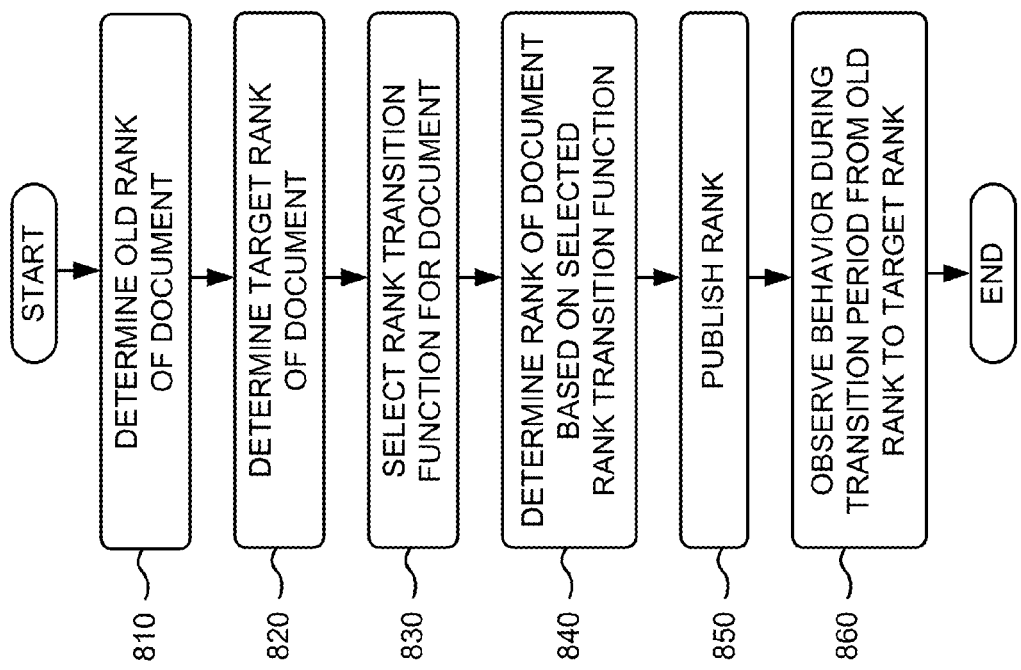

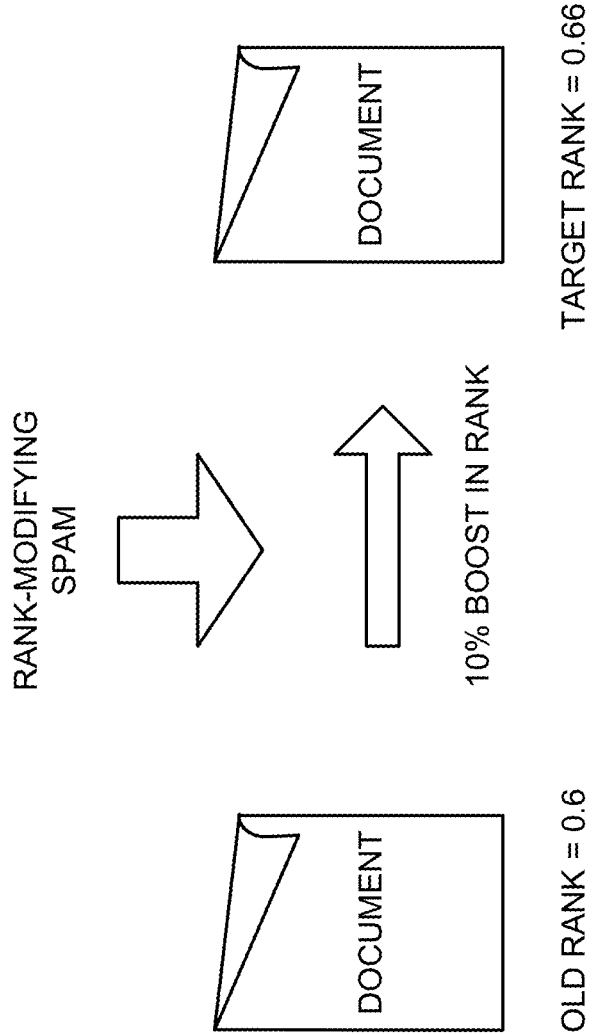

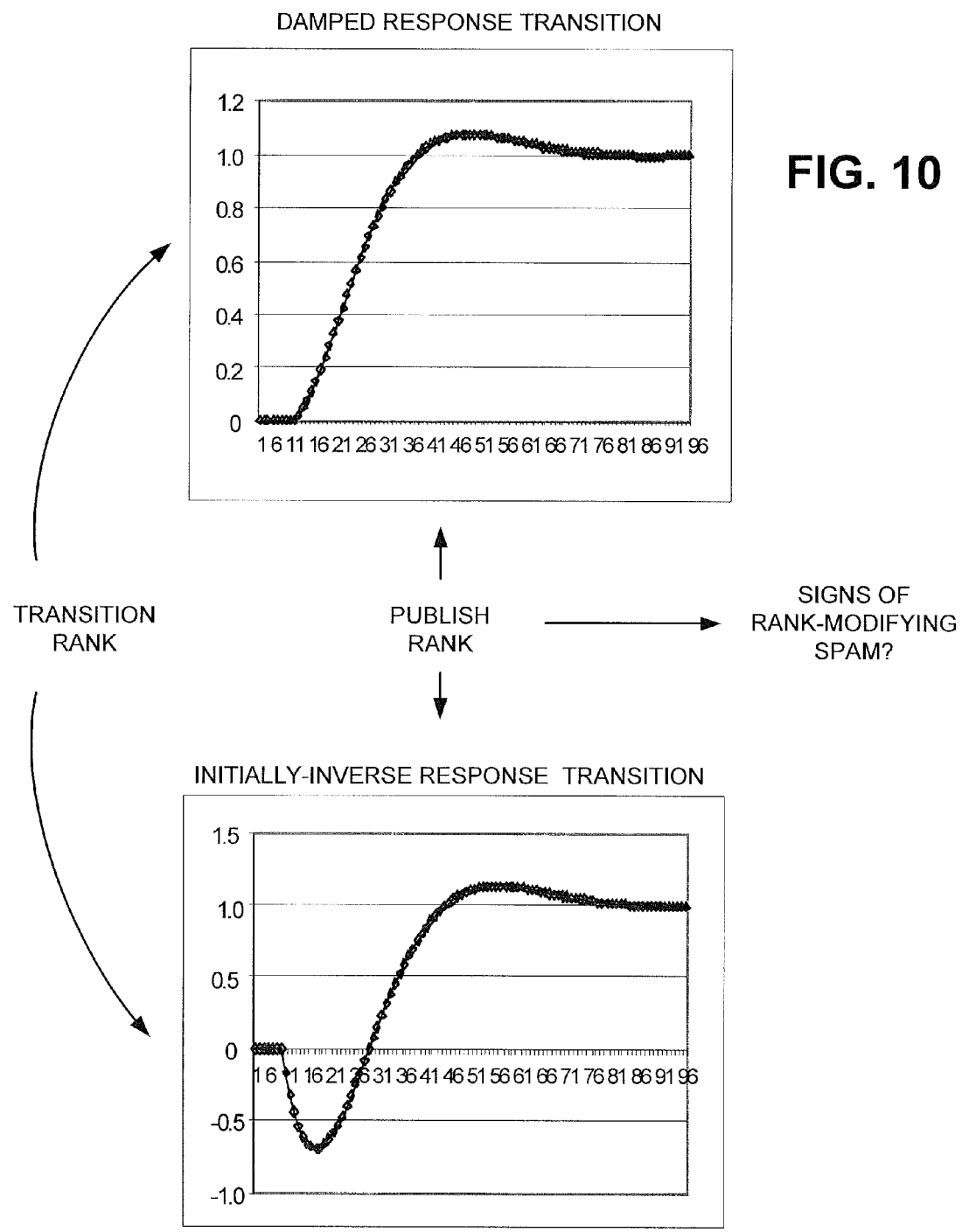

CHANGING A RANK OF A DOCUMENT BY APPLYING A RANK TRANSITION FUNCTION

RELATED APPLICATIONS

This application is a continuation of U.S. application Ser. No. 12/652,563, filed Jan. 5, 2010, which is a continuation of U.S. application Ser. No. 11/170,786, filed Jun. 30, 2005, the entire disclosures of which are incorporated herein by reference.

BACKGROUND

1. Field of the Invention

Implementations described herein relate generally to information retrieval and, more particularly, to the ranking of documents.

2. Description of Related Art

The World Wide Web ("web") contains a vast amount of information that is ever-changing. Existing search engines attempt to rank this information in a meaningful way so that they can provide high quality search results. It is beneficial for information providers (e.g., web marketers and web site designers) to have their information (or their customers' information) ranked higher by the search engines.

Rank-modifying spamming techniques, such as index and link spamming, include a set of techniques by which information providers attempt to fool a search engine into ranking their information (or their customers' information) at or near the top of the list of search results. Some of the techniques used by rank-modifying spammers include keyword stuffing, invisible text, tiny text, page redirects, META tags stuffing, and link-based manipulation.

Keyword stuffing involves the repeated use of a word (and more likely a set of words) within a page to increase its frequency on the page and, thereby, make the page appear very relevant to a search relating to the word. Invisible text includes keywords inserted in a page, where the text of the keywords is the same color as the background of the page. Tiny text involves the use of keywords in very small text within a page. Invisible text and tiny text attempt to make a page appear relevant for a wide range of search queries even though the content of the page is not very relevant, or irrelevant, to the search queries.

Page redirects involves the use of a first page with code to automatically redirect the user to a second page that typically has nothing to do with the search query the user provided. The first page typically uses another spamming technique to make the first page appear relevant for a wide range of search queries. META tags stuffing involves the use of a large set of keywords in the META tags on a page, where the keywords typically do not relate to the content of the page. META tags stuffing attempts to make the page appear relevant for a wide range of search queries even though the content of the page is not very relevant, or irrelevant, to the search queries.

Link-based manipulation may include the creation or manipulation of a first document or a set of first documents to include a link or a number of links to a second document in an attempt to increase the rank of the second document. Some existing search engines determine the rank of a document based on the number or quality of the links that point to the document. A link farm is an example of a link-based manipulation technique.

Such manipulation of search results degrades the quality of the search results provided by existing search engines.

SUMMARY

According to one aspect, a method may include determining a first rank associated with a document; determining a second rank associated with the document, where the second rank is different from the first rank; determining a transition rank associated with the document during a transition period from the first rank to the second rank; and making the transition rank available during the transition period.

According to another aspect, a method may include determining a first rank associated with a document; determining a second rank associated with the document, where the second rank is different from the first rank; and changing, during a transition period that occurs during a transition from the first rank to the second rank, a transition rank associated with the document based on a rank transition function that varies the transition rank over time without any change in ranking factors associated with the document.

According to yet another aspect, a computer-readable medium may store computer-executable instructions, including instructions for detecting a change in a rank associated with a document, where the change causes the rank to transition from a first rank to a second rank; instructions for selecting a rank transition function of a plurality of rank transition functions to be associated with the document; instructions for determining a rank associated with the document for a transition period as the rank transitions from the first rank to the second rank based on the selected rank transition function; and instructions for publishing the rank a plurality of times during the transition period.

According to a further aspect, a method may include determining a transition rank associated with a document based on a rank transition function that varies the transition rank over time without any change in a ranking factor associated with the document during a transition from a first rank to a second rank associated with the document; and making the transition rank available during the transition.

BRIEF DESCRIPTION OF THE DRAWINGS

The accompanying drawings, which are incorporated in and constitute a part of this specification, illustrate one or more embodiments of the invention and, together with the description, explain the invention. In the drawings.

FIG. 8 is a flowchart illustrating exemplary processing for identifying signs of rank-modifying spam according to an implementation consistent with the principles of the invention; and FIGS. 9 and 10 are exemplary diagrams of the processing performed with regard to FIG. 8.

DETAILED DESCRIPTION

The following detailed description of the invention refers to the accompanying drawings. The same reference numbers in different drawings may identify the same or similar elements. Also, the following detailed description does not limit the invention.

Overview

The purpose of rank-modifying spamming is to raise the rank of a document so that the document appears highly ranked in a set of search results even if that document is not relevant, or not as relevant as some lower ranked documents, to the search query. Various techniques exist, such as keyword stuffing, invisible text, tiny text, page redirects, META tags stuffing, and link-based manipulation.

Figure 1:
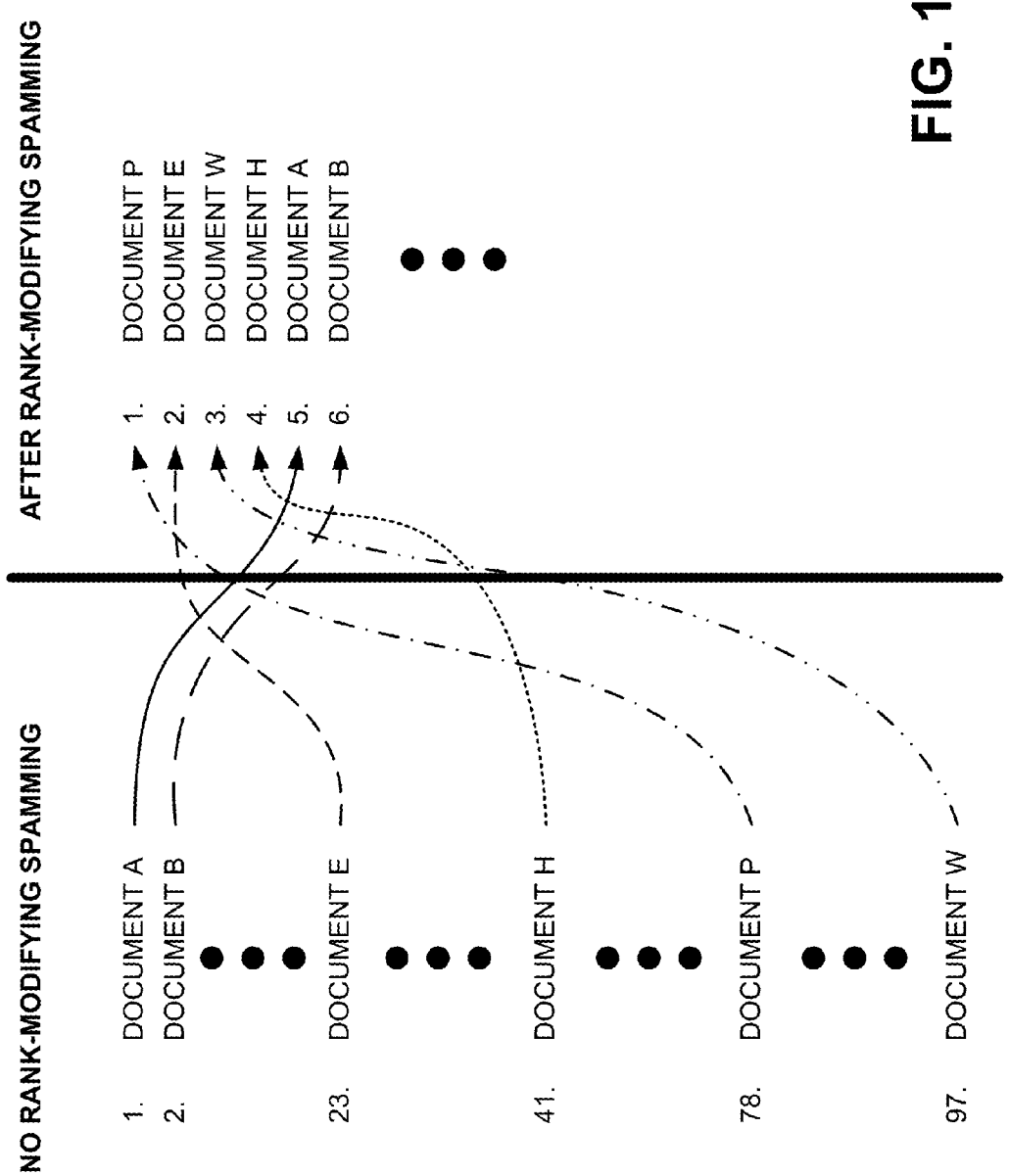
FIG. 1 is a diagram illustrating possible effects of rank-modifying spamming.

FIG. 1 is a diagram illustrating possible effects of rank-modifying spamming. A set of search results that has not been subjected to rank-modifying spamming is shown on the left hand side of FIG. 1. As shown, documents A, B, E, H, P, and W have been ranked by a search engine. Document A has been ranked 1, document B has been ranked 2, document E has been ranked 23, document H has been ranked 41, document P has been ranked 78, and document W has been ranked 97.

Assume that documents E, H, P, and W have been subjected to various rank-modifying spamming techniques to increase their ranks in the list of search results. As shown on the right hand side of FIG. 1, assume that the rank-modifying spamming causes document P to raise its rank from 78 to 1, document E to raise its rank from 23 to 2, document W to raise its rank from 97 to 3, and document H to raise its rank from 41 to 4. The rank-modifying spamming may also cause documents that would not ordinarily be included in the list of search results, such as documents unrelated to the search query, to be included and possibly highly ranked in the list of search results (not shown).

By artificially inflating the rankings of certain (low quality or unrelated) documents, rank-modifying spamming degrades the quality of the search results. Systems and methods consistent with the principles of the invention may provide a rank transition function (e.g., time-based) to identify rank-modifying spammers. The rank transition function provides confusing indications of the impact on rank in response to rank-modifying spamming activities. The systems and methods may also observe spammers' reactions to rank changes caused by the rank transition function to identify documents that are actively being manipulated. This assists in the identification of rank-modifying spammers.

As used herein, a "document" is to be broadly interpreted to include any machine-readable and machine-storable work product. A document may include, for example, an e-mail, a web page or site, a business listing, a file, a combination of files, one or more files with embedded links to other files, a news group posting, a yellow pages entry, a scanned book, a blog, a web advertisement, etc. Documents often include textual information and may include embedded information (such as meta information, hyperlinks, etc.) and/or embedded instructions (such as Javascript, etc.). A "link," as the term is used herein, is to be broadly interpreted to include any reference to/from a document from/to another document or another part of the same document.

Exemplary Network Configuration

Figure 2:
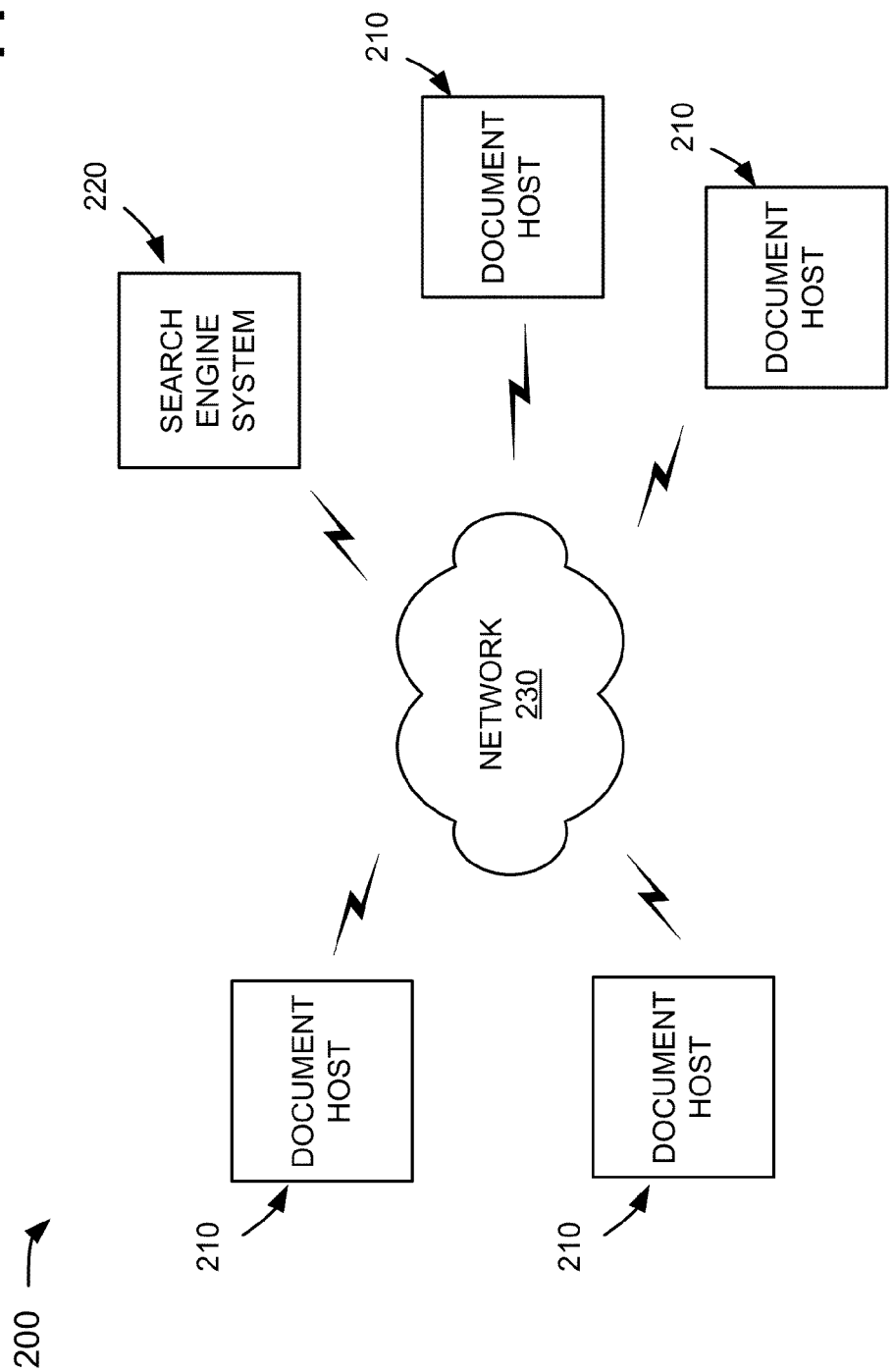
FIG. 2 is an exemplary diagram of a network in which systems and methods consistent with the principles of the invention may be implemented.

FIG. 2 is an exemplary diagram of a network 200 in which systems and methods consistent with the principles of the invention may be implemented. Network 200 may include multiple document hosts 210 connected to a search engine system 220 via a network 230. Four document hosts 210 and a single search engine system 220 have been illustrated as connected to network 230 for simplicity. In practice, there may be more or fewer document hosts 210 and/or search engine systems 220.

Document hosts 210 may include entities that store and/or manage documents. An entity may be defined as a device, such as a personal computer, a wireless telephone, a personal digital assistant (PDA), a lap top, or another type of computation or communication device, a thread or process running on one of these devices, and/or an object executable by one of these devices.

Search engine system 220 may include an entity that crawls, processes, searches, and/or maintains documents in a manner consistent with the principles of the invention. For example, search engine system 220 may crawl a corpus of documents (e.g., web documents), index the documents, rank the documents, store information associated with the documents and/or their ranks in a repository of documents, and/or search the repository based on user search queries. While search engine system 220 is shown as a single entity, it may be possible for search engine system 220 to be implemented as two or more separate (and possibly distributed) entities.

Network 230 may include a local area network (LAN), a wide area network (WAN), a telephone network, such as the Public Switched Telephone Network (PSTN), an intranet, the Internet, a memory device, or a combination of networks. Document hosts 210 and search engine system 220 may connect to network 230 via wired, wireless, and/or optical connections.

Exemplary Search Engine System Architecture

Figure 3:
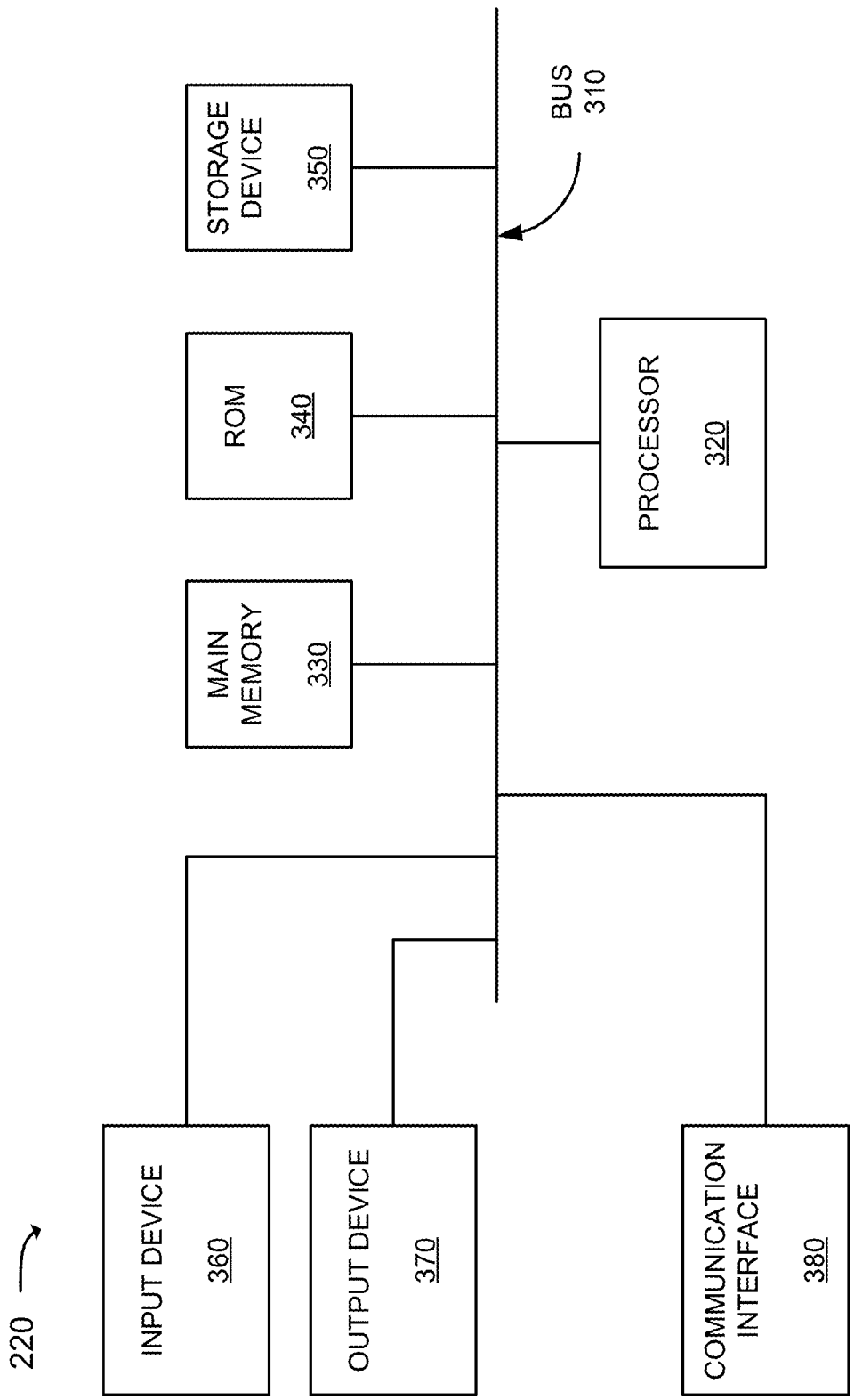
FIG. 3 is an exemplary diagram of the search engine system of FIG. 2 according to an implementation consistent with the principles of the invention.

FIG. 3 is an exemplary diagram of search engine system 220 according to an implementation consistent with the principles of the invention. Search engine system 220 may include a bus 310, a processor 320, a main memory 330, a read only memory (ROM) 340, a storage device 350, an input device 360, an output device 370, and a communication interface 380. Bus 310 may include a path that permits communication among the elements of search engine system 220.

Processor 320 may include a processor, microprocessor, or processing logic that may interpret and execute instructions. Main memory 330 may include a random access memory (RAM) or another type of dynamic storage device that may store information and instructions for execution by processor 320. ROM 340 may include a ROM device or another type of static storage device that may store static information and instructions for use by processor 320. Storage device 350 may include a magnetic and/or optical recording medium and its corresponding drive.

Input device 360 may include a mechanism that permits an operator to input information to search engine system 220, such as a keyboard, a mouse, a pen, voice recognition and/or biometric mechanisms, etc. Output device 370 may include a mechanism that outputs information to the operator, including a display, a printer, a speaker, etc. Communication interface 380 may include any transceiver-like mechanism that enables search engine system 220 to communicate with other devices and/or systems. For example, communication interface 380 may include mechanisms for communicating with another device or system via a network, such as network 230.

Search engine system 220, consistent with the principles of the invention, may perform certain operations that will be described in detail below. Search engine system 220 may perform these operations in response to processor 320 executing software instructions contained in a computer-readable medium, such as memory 330. A computer-readable medium may be defined as a physical or logical memory device and/or carrier wave.

The software instructions may be read into memory 330 from another computer-readable medium, such as data storage device 350, or from another device via communication interface 380. The software instructions contained in memory 330 may cause processor 320 to perform processes that will be described later. Alternatively, hardwired circuitry may be used in place of or in combination with software instructions to implement processes consistent with the principles of the invention. Thus, implementations consistent with the principles of the invention are not limited to any specific combination of hardware circuitry and software.

Exemplary Functional Diagram of Search Engine System

Figure 4:
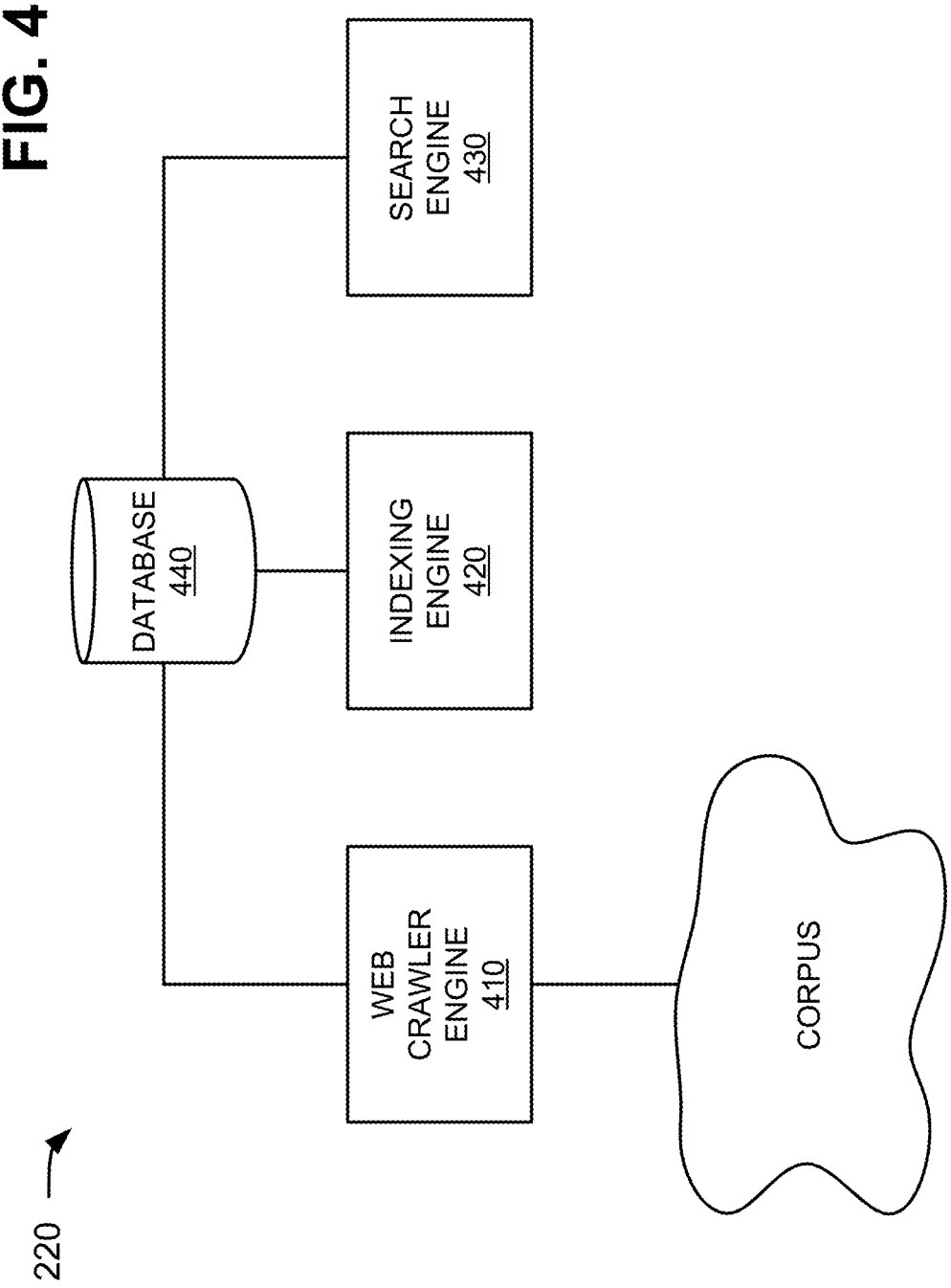
FIG. 4 is an exemplary functional block diagram of a portion of the search engine system of FIG. 2 according to an implementation consistent with the principles of the invention.

FIG. 4 is an exemplary functional block diagram of a portion of search engine system 220 according to an implementation consistent with the principles of the invention. Search engine system 220 may include a web crawler engine 410, an indexing engine 420, and a search engine 430 connected to a database 440. In one implementation, web crawler engine 410, indexing engine 420, and/or search engine 430 may be implemented by software and/or hardware within search engine system 220. In another implementation, web crawler engine 410, indexing engine 420, and/or search engine 430 may be implemented by software and/or hardware within another device or a group of devices separate from or including search engine system 220.

Generally, web crawler engine 410 may operate from a list of addresses to fetch the corresponding documents from a corpus of documents (e.g., the web). Web crawler engine 410 may extract the addresses (e.g., URLs) associated with the outgoing links in a document and add the addresses to the list of addresses to be crawled. Web crawler engine 410 may also store information associated with the document, such as all or part of the document, in database 440.

Indexing engine 420 may operate upon documents crawled by web crawler engine 410. For example, indexing engine 420 may create an index of the documents and store the index in database 440. Indexing engine 420 may update the index as new documents are crawled and added to database 440.

Search engine 430 may identify documents that are relevant to a user's search query. For example, search engine 430 may search the index in database 440 based on a search query. Search engine 430 may rank (or score) documents identified by the search, sort the documents based on their ranks (or scores), and form search results based on the sorted documents. Based on the knowledge that search results are consciously being manipulated (e.g., frequently monitored and controlled) via rank-modifying spamming, search engine 430 may, as described in more detail below, use a rank transition function that is dynamic in nature. For example, the rank transition function may be time-based, random, and/or produce unexpected results.

The rank of a document may change over time due, for example, to changes in the document itself, the links pointing to the document, or documents with links to the document (sometimes referred to as "linking documents"). These changes may be the result of legitimate modifications or rank-modifying spamming. The rank of the document before the changes may be referred to as the "old rank" and the rank of the document after the changes may be referred to as the "target rank." The rank transition function may generate a "transition rank" that is interposed between the old rank and the target rank. The transition rank may cause a time-based delay response, a negative response, a random response, and/or an unexpected response to occur during the transition from the old rank to the target rank.

Search engine 430 may also correlate the dynamics of a document's rank with the response of the rank transition function to determine whether the document's rank is being manipulated by rank-modifying spamming. For example, strong correlations between a document's rank and a rank associated with the response of the rank transition function over time may indicate deliberate manipulation of the search results.

Database 440 may be embodied within a single memory device or within multiple (possibly distributed) memory devices. Database 440 may store the list of addresses used by web crawler engine 410, information associated with documents crawled by web crawler engine 410, and/or the index generated by indexing engine 420.

Exemplary Rank Transition Function

An exemplary rank transition function consistent with the principles of the invention may be derived from a conventional ranking algorithm. For example, the rank transition function may insert time-based and/or random factor(s) into a conventional ranking algorithm. In one implementation, the conventional ranking algorithm may rank documents based on link-based information (e.g., information regarding the incoming and/or outgoing links associated with the documents, such as the number of incoming and/or outgoing links, weights assigned to the incoming and/or outgoing links, information regarding the linking documents, etc.).

While the description to follow may describe the conventional ranking algorithm as being based on just link-based information, the conventional ranking algorithm can be based on factors other than or in addition to link-based information. The phrase "ranking factor" or "ranking factors" might be used to refer to any type, or all types, of factors that might be used in determining the rank of a document, such as link-based information, an information retrieval score based on a match of a search query term to the content of a document, an indicator of document freshness, information regarding the manner in which a document's content changes over time, information relating to user behavior associated with the document, etc.

The conventional ranking algorithm may generate a rank R. The conventional ranking algorithm gives one possible solution (i.e., rank R) given a set of input parameters, such as a group of documents and link information. In other words, the rank R will not change if the input parameters do not change. If the input parameters change, such as a change in the number of links, then rank R will change in a discrete step at the time of computation of the new rank R.

Figure 5:
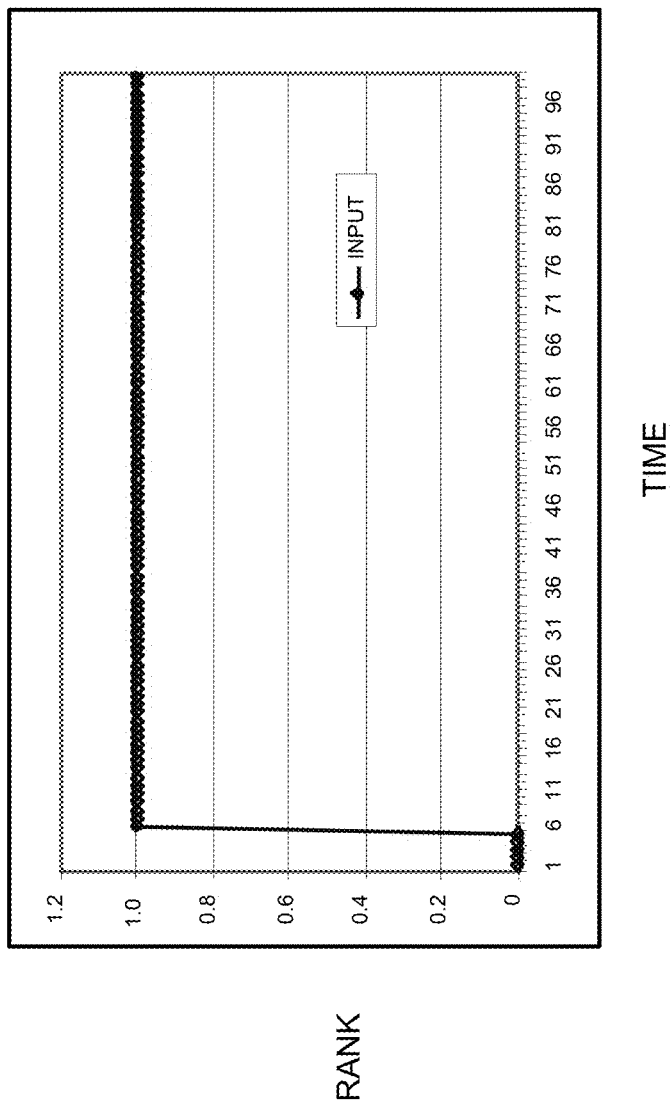
FIG. 5 is an exemplary time-response graph illustrating the influence of changes in link-based information on the rank of a document.

FIG. 5 is an exemplary time-response graph illustrating the influence of changes in link-based information on the rank of a document. As shown in FIG. 5, the rank of a document changes almost immediately in response to a change in its link-based information. Other than a time delay before the new rank R is computed and published (i.e., made available to the public), the net effect of the manipulation is known to the spammer as soon as the new rank R is made available.

An exemplary rank transition function consistent with the principles of the invention may introduce time-based dynamics into a conventional ranking algorithm. As a result, changes in the input parameters do not result in an immediate change in the new rank. Instead, the rank associated with a document may vary over time in response to a change in the input parameters.

In one implementation, the rank transition function may have second order dynamics represented by:

$$\frac{d^2}{dt^2}P = k1*(R-P) - k2*\frac{d}{dt}P,$$

where P is the transition rank of a document, R is the static rank periodically computed for the document, and k1 and k2 are parameters that determine the speed and damping of the response. With second order dynamics, it is like the rank of a document is determined by moving a mass attached to a spring and damper. The mass will accelerate at a rate proportional to how much the spring was displaced, and it will pick up speed, be damped, and then end up at some point determined by the net change in the initial spring displacement. This rank transition function may also be referred to as a "damped response transition function."

Figure 6:
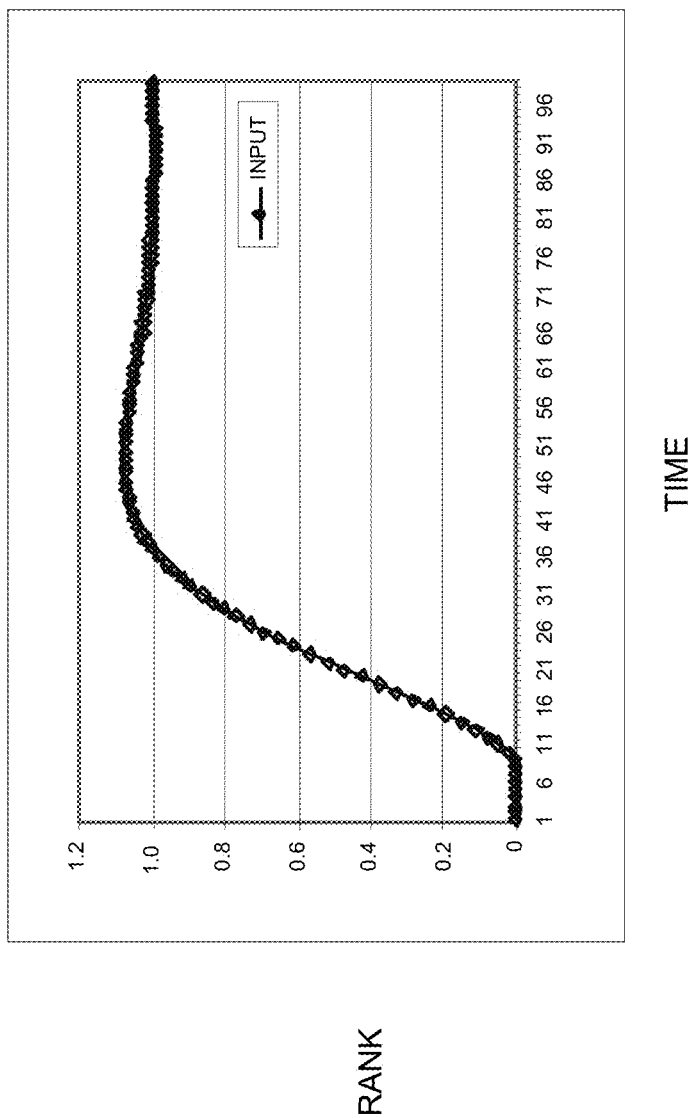
FIG. 6 is an exemplary time-response graph illustrating the influence of changes in link-based information on the rank of a document according to an implementation consistent with the principles of the invention.

FIG. 6 is an exemplary time-response graph illustrating the influence of changes in link-based information on the rank of a document according to an implementation consistent with the principles of the invention. As shown in FIG. 6, the rank of a document slowly responds to a positive change in its link-based information. After a period of time, the document's rank might settle in on its new steady state (target) value. The time line shown in FIG. 6 may be represented in days in one implementation consistent with the principles of the invention. In other words, it might take approximately 70 days for a change in a document's link-based information to change the rank of the document to its steady state (target) value (e.g., 1.0 in FIG. 6).

In another implementation, the rank transition function may initially respond counter to the intended change. For example, consider the set of equations:

$$\frac{d^2}{dt^2}y = k1*(R-y) - k2*\frac{d}{dt}y,$$

$$P = y - k3*\frac{d}{dt}y,$$

where y is an intermediate variable and k1-k3 are parameters that determine the speed and damping of the response. This rank transition function may cause the rank of a document to initially decrease before increasing in response to a change in the document's link-based information. This rank transition function can provide a non-minimum phase response and may be referred to as an "initially-inverse response transition function."

Figure 7:
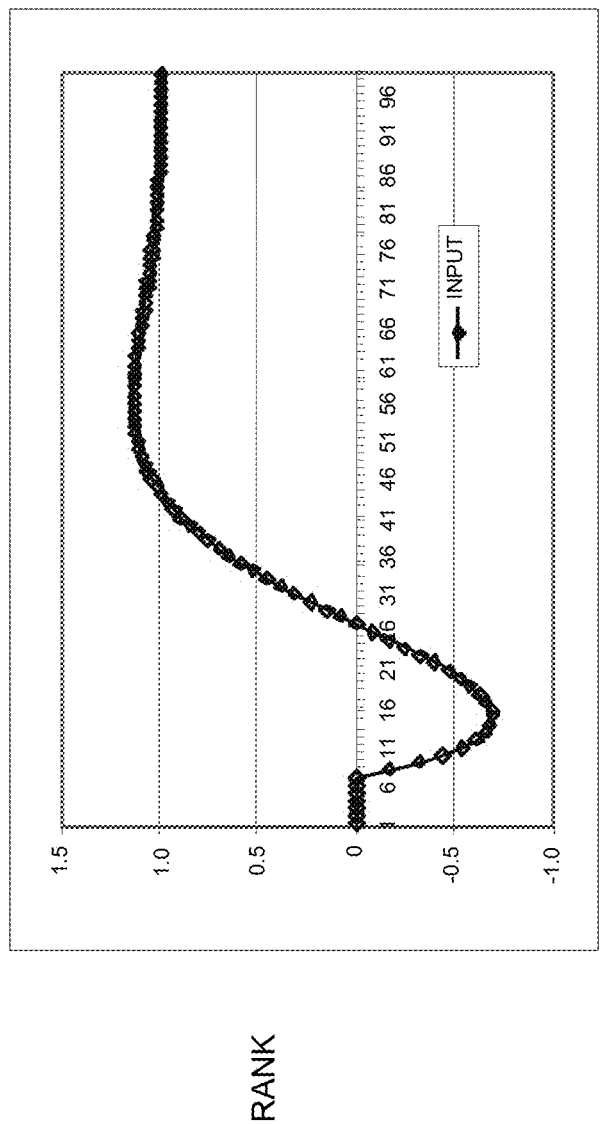
FIG. 7 is an exemplary time-response graph illustrating the influence of changes in link-based information on the rank of a document according to another implementation consistent with the principles of the invention.

FIG. 7 is an exemplary time-response graph illustrating the influence of changes in link-based information on the rank of a document according to this other implementation consistent with the principles of the invention. As shown in FIG. 7, the rank of a document may initially decrease in response to a positive change in its link-based information. After a period of time, the document's rank might rise to its new steady state (target) value. Like FIG. 6, the time line shown in FIG. 7 may be represented in days in one implementation consistent with the principles of the invention. In other words, the document's rank may decrease for a period of approximately 20 days before settling in on its new steady state (target) value (e.g., 1.0 in FIG. 7) in approximately 70 days after a positive change in its link-based information.

While two exemplary rank transition functions have been described above, implementations consistent with the principles of the invention are not limited to these transition functions. In other implementations, transition functions based on time delays, pre-computed piecewise time-series, or a process that examines time after a change and indicates no effect, positive effect, or negative effect may alternatively or additionally be used.

Exemplary Processing

When a spammer tries to positively influence a document's rank through rank-modifying spamming, the spammer may be perplexed by the rank assigned by a rank transition function consistent with the principles of the invention, such as the ones described above. For example, the initial response to the spammer's changes may cause the document's rank to be negatively influenced rather than positively influenced. Unexpected results are bound to elicit a response from a spammer, particularly if their client is upset with the results. In response to negative results, the spammer may remove the changes and, thereby render the long-term impact on the document's rank zero. Alternatively or additionally, it may take an unknown (possibly variable) amount of time to see positive (or expected) results in response to the spammer's changes. In response to delayed results, the spammer may perform additional changes in an attempt to positively (or more positively) influence the document's rank. In either event, these further spammer-initiated changes may assist in identifying signs of rank-modifying spamming.

FIG. 8 is a flowchart illustrating exemplary processing for identifying signs of rank-modifying spam according to an implementation consistent with the principles of the invention. FIGS. 9 and 10 are exemplary diagrams of the processing performed with regard to FIG. 8.

Processing may begin with a determination of the old rank of the document (block 810). The old rank of a document may be the last-determined rank of the document. The old rank may be stored and associated with the document. In this case, the old rank may be determined by reading the value from a memory. As shown in FIG. 9, assume that the document has an old rank of 0.6.

The target rank of the document may also be determined (block 820). When no changes have occurred in association with the document between the determination of the old rank and the target rank, then the target rank equals the old rank. Assume, however, that there have been changes to the document, links pointing to the document, or the linking documents associated with the document as a result of one or more rank-modifying spamming techniques, as shown in FIG. 9. Assume that the one or more rank-modifying spamming techniques cause a 10% boost in the rank of the document. In this case, the target rank may be 0.66, as shown in FIG. 9.

A rank transition function may be selected for this document (block 830). For example, the damped response transition function (e.g., FIG. 6) or the initially-inverse response transition function (e.g., FIG. 7) may be selected. In one implementation, a rank transition function may be selected on a per-document basis. In another implementation, a rank transition function may be selected for the domain/site with which the document is associated, the server on which the document is hosted, or a set of documents that share a similar trait (e.g., the same author (e.g., a signature in the document), design elements (e.g., layout, images, etc.), etc.). In any of these situations, the documents associated with the domain/site/set or hosted by the same server may be subjected to the same rank transition function. In yet another implementation, a rank transition function may be selected randomly. In a further implementation, if a document is identified as "suspicious" (described below), a different rank transition function may be selected for that document.

The rank of the document may then be determined based on the selected rank transition function (block 840). As shown in FIG. 10, the rank of the document may change during the transition period from the old rank to the target rank. For example, if the damped response transition function is selected, the document's rank may slowly increase over a period of time, such as several days, before settling in on the target rank. If the initially-inverse response transition function is selected, the document's rank may initially be caused to decrease (negative influence) before seeing the 10% increase. In this case, the negative influence may last several days as may the increase to 0.66.

The rank of the document may be published (i.e., made available to the public) (block 850). The determination of the rank of the document during the transition period (block 840) and the publication of the document rank (block 850) may occur for a number of iterations. As such, the rank of the document may change in a manner that is unexpected by a spammer. For example, in the transition of the rank from the old rank to the target rank, the rank may decrease (negative response) in response to a spamming technique intended to increase the rank of the document. Alternatively, or additionally, in the transition period of the rank from the old rank to the target rank, the rank may increase only a small amount for a period of time (delayed response) in response to a spamming technique intended to increase the rank of the document much more than the small amount of the increase.

As explained above, the delayed and/or negative response to the rank-modifying spamming may cause the spammer to take other measures to correct it. For example, for a delayed response, the spammer may subject the document to additional rank-modifying spamming (e.g., adding additional keywords, tiny text, invisible text, links, etc.). For a negative response, the spammer may revert the document and/or links to that document (or other changes) to their prior form in an attempt to undo the negative response caused by the rank-modifying spamming.

The spammer's behavior may be observed to detect signs that the document is being subjected to rank-modifying spamming (block 860). For example, if the rank changed opposite to the initial 10% change, then this may correspond to a reaction to the initially-inverse response transition function. Also, if the rank continues to change unexpectedly (aside from the change during the transition period due to the rank transition function), such as due to a spammer trying to compensate for the undesirable changes in the document's rank, then this would be a sign that the document is being subjected to rank-modifying spamming.

Correlation can be used as a powerful statistical prediction tool. In the event of a delayed (positive) rank response, the changes made during the delay period that impact particular documents can be identified. In the event of a negative initial rank response, correlation can be used to identify reversion changes during the initial negative rank response. In either case, successive attempts to manipulate a document's rank will be highlighted in correlation over time. Thus, correlation over time can be used as an automated indicator of rank-modifying spam.

When signs of rank-modifying spamming exist, but perhaps not enough for a positive identification of rank-modifying spamming, then the "suspicious" document may be subjected to more extreme rank variations in response to changes in its link-based information. Alternatively, or additionally, noise may be injected into the document's rank determination. This noise might cause random, variable, and/or undesirable changes in the document's rank in an attempt to get the spammer to take corrective action. This corrective action may assist in identifying the document as being subjected to rank-modifying spamming.

If the document is determined to be subjected to rank-modifying spamming, then the document, site, domain, and/or contributing links may be designated as spam. This spam can either be investigated, ignored, or used as contra-indications of quality (e.g., to degrade the rank of the spam or make the rank of the spam negative).

CONCLUSION

Implementations consistent with the principles of the invention may rank documents based on a rank transition function. The ranking based on the rank transition function may be used to identify documents that are subjected to rank-modifying spamming. The rank transition may provide confusing indications of the impact on rank in response to rank-modifying spamming activities. Implementations consistent with the principles of the invention may also observe spammers' reactions to rank changes to identify documents that are actively being manipulated.

The foregoing description of aspects consistent with the principles of the invention provides illustration and description, but is not intended to be exhaustive or to limit the invention to the precise form disclosed. Modifications and variations are possible in light of the above teachings or may be acquired from practice of the invention.

For example, while a series of acts has been described with regard to FIG. 8, the order of the acts may be modified in other implementations consistent with the principles of the invention. Further, non-dependent acts may be performed in parallel.

It will be apparent to one of ordinary skill in the art that aspects of the invention, as described above, may be implemented in many different forms of software, firmware, and hardware in the implementations illustrated in the figures. The actual software code or specialized control hardware used to implement aspects consistent with the principles of the invention is not limiting of the invention. Thus, the operation and behavior of the aspects were described without reference to the specific software code—it being understood that one of ordinary skill in the art would be able to design software and control hardware to implement the aspects based on the description herein.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
identifying, by at least one computer device, a document associated with a rank, the rank having a first value before a first time;
detecting, by at least one computer device and at the first time, a change to a ranking factor associated with the document;
determining, by at least one computer device and based on the change to the ranking factor, a second value for the rank;
changing, by at least one computer device and during a transition period between the first time and a second time, the rank from the first value to the second value by applying a rank transition function to the rank,
the rank transition function being one of a damped response transition function or an initially-inverse response transition function, and
the rank transition function causing the rank to have:
the second value at the second time, and
one or more third values during the transition period, the one or more third values being different from the first value and the second value at one or more times during the transition period; and
using, by at least one computer device, the rank in a search operation related to the document, the rank having:
the first value when the search operation occurs before the first time,
the second value when the search operation occurs at the second time, and
a particular third value of the one or more third values when the search operation occurs during the transition period.

2. The method of claim 1, where the particular third value is less than the first value or the second value at a time of the one or more times during the transition period.

3. The method of claim 1, where the particular third value is greater than the first value or the second value at a time of the one or more times during the transition period.

4. The method of claim 1, where changing the rank of the document includes:
adjusting the rank of the document, during the transition period, based on at least one of:
a time-based factor, or
a random factor.

5. The method of claim 1, where changing the rank of the document includes:
determining, based on the rank transition function, a plurality of different third values that correspond to a respective plurality of times during the transition period, the one or more third values including the plurality of different third values.

6. The method of claim 1, further comprising:
monitoring the ranking factor during the transition period to produce monitoring results;
detecting, based on the monitoring results, an indication of rank-manipulation of the document during the transition period; and
based on detecting the indication of rank-manipulation, designating as spam at least one of:
the document,
a site associated with the document,
a domain associated with the document,
a link associated with the document, or
another document that links to the document.

7. The method of claim 6, further comprising:
adjusting, based on detecting the indication of rank-manipulation, the rank of the document.

8. A non-transitory memory device to store instructions, the instructions comprising:
one or more instructions that, when executed by one or more computer devices, cause the one or more computer devices to:
identify a document associated with a rank,
the rank having a first value before a first time,
detect, at the first time, a change to a ranking factor associated with the document,
determine, based on the change to the ranking factor, a second value for the rank,
change, during a transition period between the first time and a second time,
the rank from the first value to the second value by applying a rank transition function to the rank,
the rank transition function being one of a damped response transition function or an initially-inverse response transition function, and
the rank transition function causing the rank to have:
the second value at the second time, and
one or more third values during the transition period, the one or more third values being different from the first value and the second value at one or more times during the transition period, and
use the rank in a search operation related to the document, the rank having:
the first value when the search operation occurs before the first time,
the second value when the search operation occurs at the second time, and
a particular third value of the one or more third values when the search operation occurs during the transition period.

9. The non-transitory memory device of claim 8, where the particular third value is less than the first value or the second value at a time of the one or more times during the transition period.

10. The non-transitory memory device of claim 8, where the particular third value is greater than the first value or the second value at a time of the one or more times during the transition period.

11. The non-transitory memory device of claim 8, where the one or more instructions to change the rank include:
one or more instructions to adjust the rank of the document, during the transition period, based on at least one of:
a time-based factor, or
a random factor.

12. The non-transitory memory device of claim 8, where the one or more instructions to change the rank include:
one or more instructions to determine, based on the rank transition function, a plurality of different third values that correspond to a respective plurality of times during the transition period,
the one or more third values including the plurality of different third values.

13. The non-transitory memory device of claim 8, where the one or more instructions further include:
one or more instructions to:
monitor the ranking factor during the transition period to produce monitoring results;
detect, based on the monitoring results, an indication of rank-manipulation of the document during the transition period; and based on detecting the indication of rank-manipulation, designate as spam at least one of:
- the document,
- a site associated with the document,
- a domain associated with the document,
- a link associated with the document, or
- another document that links to the document.

14. The non-transitory memory device of claim 13, where the one or more instructions further include:
one or more instructions to:
adjust, based on detecting the indication of rank-manipulation, the rank of the document.

15. A system comprising:
one or more computer devices to:
detect a change, at a first time, to one or more ranking factors associated with a document,
the document having a first rank value prior to the change to the one or more ranking factors,
determine, based on the change to the one or more ranking factors, a second rank value for the document after the change to the one or more ranking factors,
calculate, based on the first rank value and the second rank value and by using a rank transition function, a plurality of different third rank values to associate with the document at a respective plurality of intermediate times in a transition period between the first time and a second time,
the rank transition function being one of a damped response transition function or an initially-inverse response transition function,
use a particular rank value, of the plurality of different third rank values, for a first search operation, related to the document, during the transition period, and
use the second rank value for a second search operation, related to the document, at the second time.

16. The system of claim 15, where the one or more computer devices, when calculating the plurality of different third rank values using the rank transition function, are to:
calculate the plurality of different third rank values further based on at least one of:
- a time-based factor, or
- a random factor.

17. The system of claim 15, where the one or more computer devices, when calculating the plurality of different third rank values, are to:
calculate at least one third rank value, of the plurality of different third rank values, that is less than the first rank value or the second rank value.

18. The system of claim 15, where the one or more computer devices, when calculating the plurality of different third rank values, are to:
calculate at least one third rank value, of the plurality of different third rank values, that is greater than the first rank value or the second rank value.

19. The system of claim 15, where the one or more computer devices are further to:
monitor the one or more ranking factors during the transition period to produce monitoring results,
detect, based on the monitoring results, an indication of rank-manipulation of the document during the transition period, and
adjust, based on detecting the indication of rank-manipulation, a rank of the document.

20. The system of claim 15,
where the rank transition function is the initially-inverse response transition function,
where the particular rank value is less than the first rank value, and
where another rank value, of the plurality of different third rank values, is greater than the first rank value and less than the second rank value.

* * * * *